Patented Sept. 22, 1942

2,296,363

UNITED STATES PATENT OFFICE 2,296,363

DETERIORATION RETARDER

William E. Messer, Cheshire, Conn., assignor, by mesne assignments, to United States Rubber Company, New York, N. Y., a corporation of New Jersey No Drawing. Application September 8, 1938, Serial No. 228,935

16 Claims. (Cl. 260—860)

This invention relates to a new class of deterioration retarders.

An object of the invention is to provide a new class of anti-oxidants or age resistors for organic substances which tend to deteriorate by absorption of oxygen from the air, for example, goods of rubber or allied gums, unsaturated fatty oils such as unsaturated vegetable oils, essential oils, petroleum oils and their derivatives such as gasoline, soaps, aldehydes, synthetic resins, turpentine, paints and varnishes containing drying oils, and the like. A further object of the invention is to provide chemicals which additionally act as flex improvers or anti-flex cracking agents for vulcanized rubber such as tire treads which undergo repeated strains during use. Another and outstanding object is to provide a rubber anti-oxidant having non-discoloring properties in addition to suitable deterioration retarding properties. Further objects will be apparent from the following description.

According to the invention, the organic substance is treated with a product of reaction resulting from the combination of 1 mole of a phenol of the formula

(where R is an aromatic nucleus, and R' is hydrogen or alkyl), with at least 1 mole of a ketone with the elimination of water of condensation. The preferred chemicals are those in which a para dihydroxy benzene such as hydroquinone is reacted with an aliphatic ketone such as acetone. The products are either viscous liquids or amorphous resins. For the purpose of this invention the products may be termed alkenyl substituted phenols either in their simple or polymeric form. The reaction may be carried out in the presence of a dehydration or condensing agent such as hydrochloric acid, and with or without the addition of a solvent. Best results are obtained by carrying out the condensation with the introduction of anhydrous hydrochloric acid gas (hydrogen chloride).

The reaction products are believed to have the following general formula:

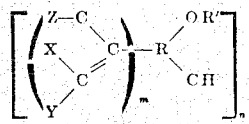

R represents an arylene group; X, and Y are hydrogen or an alkyl radical; Z is an alkyl or aryl group which may be joined to Y to form a closed ring; $n$ is one or a multiple of 1 as in the case of a polymer; $m$ is 1 or 2; R' is hydrogen or alkyl.

The reaction product of acetone and hydroquinone (isopropenyl hydroquinone) is illustrated by the formula:

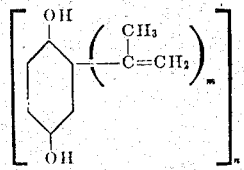

In these formulae the aromatic nuclei may or may not be further substituted.

Further examples of such products are di-isopropenyl hydroquinone, ethenyl (vinyl) hydroquinone, iso-butenyl hydroquinone, beta phenyl vinyl hydroquinone.

The following examples, in which the parts are by weight, are given in illustration of the invention:

*Example 1.*—1000 grams of hydroquinone and 800 grams of acetone are placed in a suitably lined vessel such as a glass vessel equipped with an agitator and reflux condenser. To this are added 600 grams of 20° Bé. hydrochloric acid, and anhydrous hydrochloric acid gas is passed in to saturate the mixture. The gas is passed in continuously at a slow rate to maintain saturation while the mixture is heated to a refluxing temperature. After refluxing 1½ hours the temperature rises from 74–84° C. 400 grams more acetone are added, and heating with agitation is continued for 12 hrs., whereupon the mixture becomes very viscous. 400 grams of acetone are then added with agitation, and heating continued for about 4 hrs. longer. Thereafter an additional 100 grams of acetone are added and heating continued until there is no further evidence of reaction. The reaction product, after cooling sets to a brittle resin, which may be pulverized by ball milling and then if desired washed, as with soda solution, until neutral. The dry, powdered product weighs about 1900 grams and melts over a range of 116–175° C. About 15 grams of hydroquinone may be recovered from the liquid phase and wash waters. The yield of reaction product corresponds to a reaction of about 2½ moles of acetone reacted with 1 mole of hydroquinone.

*Example 2.*—A viscous reaction product of hydroquinone and acetone may be prepared by reacting a solution, in acetic acid, of equi-molecular proportions of hydroquinone and acetone, with a small amount of concentrated hydrochloric acid (0.2–0.3± mols) under reflux for at least 8 hours. The crude product may be treated to recover untreated intermediates, solvent catalyst, etc., by any appropriate method, as by precipitation, by adding to a large amount of water followed by separation, washing and distillation, of aqueous portions to recover acetone, hydroquinone, and catalyst. The product is a polymerized isopropenyl hydroquinone. It may be used as such or various fractions may be separated and used. The table directly following shows the effect in rubber of the product and various fractions thereof. T represents tensile in pounds per square inch and E represents percent elongation at break.

Recipe

| Stock | A | B |
|---|---|---|
| Pale crepe | 101.50 | 101.50 |
| Zinc oxide | 10 | 10 |
| Lithopone | 60 | 60 |
| Whiting | 60 | 60 |
| Sulfur | 3 | 3 |
| Tetra methyl thiuram monosulfide | 0.15 | 0.15 |
| Polymerized isopropenyl hydroquinone | | 1.00 |

Tensile—Elongation

| Cure in min. at 25 lbs. per sq. in. steam pressure | T—E | T—E |
|---|---|---|
| UNAGED | | |
| 10 | 2,100–686 | 1,980–713 |
| 20 | 2,500–693 | 2,400–740 |
| 30 | 2,300–706 | 2,200–726 |
| AGED 72 HOURS IN OXYGEN | | |
| 10 | 620–513 | 1,750–670 |
| 20 | 240–236 | 1,780–656 |
| 30 | | 1,070–563 |

The results of using a fraction from the hydroquinone acetone product, which fraction boils from 150–230° C. at 2 mm. mercury and which is a white resin is indicated as follows:

Recipe

| Stock | A | C |
|---|---|---|
| Pale crepe | 101.50 | 101.50 |
| Zinc oxide | 10 | 10 |
| Lithopone | 60 | 60 |
| Whiting | 60 | 60 |
| Sulfur | 3 | 3 |
| Tetra methyl thiuram monosulfide | 0.15 | 0.15 |
| 150–230° C. at 2 mm. fraction of hydroquinone acetone | | 1.00 |

Tensile—Elongation

| Cure in min. at 25 lbs. per sq. in. steam pressure | T—E | T—E |
|---|---|---|
| UNAGED | | |
| 10 | 2,260–763 | 2,300–763 |
| 20 | 2,480–713 | 2,460–753 |
| 30 | 2,540–736 | 2,470–736 |
| AGED 72 HOURS IN OXYGEN | | |
| 10 | 1,130–630 | 1,980–663 |
| 20 | 840–586 | 2,000–670 |
| 30 | 40–206 | 1,780–680 |

The results in rubber from using a fraction of the hydroquinone-acetone reaction product which fraction boils from 230–260° C. at 2 mm. mercury and which is a white resin is as follows:

Recipe

| Stock | A | D |
|---|---|---|
| Pale crepe | 100 | 100 |
| Zinc oxide | 10 | 10 |
| Lithopone | 60 | 60 |
| Whiting | 60 | 60 |
| Sulfur | 3 | 3 |
| Tetramethyl thiuram monosulfide | 0.15 | 0.15 |
| 230–260° at 2 mm. fraction of hydroquinone acetone | | 1.00 |

Tensile—Elongation

| Cure in min. at 25 lbs. per sq. in. steam pressure | T—E | T—E |
|---|---|---|
| UNAGED | | |
| 10 | 2,260–763 | 1,900–733 |
| 20 | 2,480–713 | 2,480–706 |
| 30 | 2,540–736 | 2,460–700 |
| AGED 72 HOURS IN OXYGEN | | |
| 10 | 1,130–630 | 1,760–643 |
| 20 | 840–586 | 2,000–676 |
| 30 | 40–206 | 1,740–663 |

In place of the acetone-hydroquinone products, there may be used any of the following materials with similar results:

o-Isopropenyl phenol (a water white liquid boiling at about 204° C.);

Hydrochloric acid polymerized o-isopropenyl phenol (a viscous resin);

A reaction product of acetone with wood creosote (consisting of a mixture of phenols including guaiacol, xylenols, creosol and the homo-cresols);

A composite mixture resulting from reacting acetone and wood creosote may be used as such or a fraction thereof boiling from 100–190° C. at 2 mm. pressure which is a viscous liquid may be used.

An acetone-catechol reaction product (yellow solid of melting point of about 300° C.±) may also be used in place of the hydroquinone-acetone reaction products.

None of the above enumerated materials discolor white rubber stocks before or after cure, during ageing in the sunlight, and none of them activate the cure.

Further reaction products which may be prepared according to the invention described above are the reaction products of acetone and dihydroxy naphthalene (isopropenyl dihydroxy naphthalene) or the products corresponding to ethenyl dihydroxy naphthalene or isobutenyl dihydroxy naphthalene, or the reaction products of acetone and dihydroxy diphenyl, acetone and creosol, acetone and guaiacol, or acetone and eugenol, which products as aforesaid result from the reaction of one mole of the phenol with at least one mole of the ketone. Any ketone having a hydrogen atom alpha to the carbonyl group may be reacted with any of the said phenols, for example methyl ethyl ketone, acetophenone, methyl B-naphthyl ketone, camphor, ethyl phenyl ketone, etc.

Incident to their use in paints and varnishes, the materials may be used as controllers of oxidation to regulate the rate of drying of finishes which dry by oxidation.

The invention may be applied to the preservation of natural rubber compositions, as well as artificially-prepared rubber compositions, including reclaimed rubbers, and latices of such rubber compositions.

It is also to be understood that other desired filling and compounding ingredients may be incorporated along with the preservative, for example, in the case of rubber, there may be incorporated other accelerators, softeners, etc.

The antioxidant may be incorporated in any type of rubber composition, such as those used for automobile tires and tubes, hose, belting, sheet and thread rubber, rubberized fabrics, molded goods, boots and shoes, etc., whether vulcanized in a mold, in open steam, in hot air, or in the cold by the so-called acid process. The proportion of the anti-oxidant may vary from about 0.1% to 5%, although either smaller or greater proportions may be found useful. If the material to which it is added is a liquid such as rubber cement or an oil, the antioxidant may be dissolved therein a suitable small proportion. The antioxidant may be incorporated into solid substances by milling or mastication, and prepared for incorporation into dispersions or solutions either in powder, paste or solution form, or applied in such forms for incorporation by diffusion, to the surfaces of vulcanized or unvulcanized rubber goods.

Having thus described my invention, what I claim and desire to protect by Letters Patent is:

1. A process of preserving a rubber composition which comprises incorporating therein an alkenyl substituted phenol.

2. A process of preserving a rubber composition which comprises incorporating therein a polymerized alkenyl substituted phenol.

3. A process of preserving a rubber composition which comprises incorporating therein an alkenyl substituted phenol resulting from the reaction between 1 molecular proportion of a dihydroxy phenol and at least one molecular proportion of a ketone.

4. A process of preserving a rubber composition which comprises incorporating therein an alkenyl substituted phenol resulting from the reaction between 1 molecular proportion of a dihydroxy phenol and at least one molecular proportion of an aliphatic ketone.

5. A process of preserving a rubber composition which comprises incorporating therein an alkenyl substituted phenol resulting from the reaction between 1 molecular proportion of a dihydroxy phenol and at least one molecular proportion of acetone.

6. A process of preserving a rubber composition which comprises incorporating therein an alkenyl substituted phenol resulting from the reaction between 1 molecular proportion of a para dihydroxy benzene and at least one molecular proportion of an aliphatic ketone.

7. A process of preserving a rubber composition which comprises incorporating therein an alkenyl substituted phenol resulting from the reaction between 1 molecular proportion of hydroquinone and at least one molecular proportion of an aliphatic ketone.

8. A rubber composition containing an alkenyl substituted phenol resulting from the reaction between 1 molecular proportion of a phenol of the formula

where R is an aromatic nucleus, and R' is a radical selected from the group consisting of hydrogen and alkyl, and at least one molecular proportion of acetone.

9. A rubber composition containing a polymerized acetone-hydroquinone reaction product.

10. A rubber composition containing an isopropenyl p-dihydroxy compound of the benzene series.

11. A rubber composition containing a polymerized isopropenyl p-dihydroxy compound of the benzene series.

12. A rubber composition in which has been incorporated an alkenyl substituted phenol resulting from the reaction between 1 molecular proportion of a phenol of the formula

where R is an aromatic nucleus, and R' is a radical selected from the group consisting of hydrogen and alkyl, and at least one molecular proportion of a ketone.

13. A rubber composition in which has been incorporated an alkenyl substituted phenol resulting from the reaction between 1 molecular proportion of a phenol of the formula

where R is an aromatic nucleus, and R' is a radical selected from the group consisting of hydrogen and alkyl, and at least one molecular proportion of acetone.

14. A process of preserving a rubber composition which tends to deteriorate by absorption of oxygen from the air which comprises incorporating therein an alkenyl substituted phenol resulting from the reaction between 1 molecular proportion of hydroquinone and at least one molecular proportion of acetone.

15. A rubber composition in which has been incorporated an alkenyl substituted phenol resulting from the reaction between 1 molecular proportion of a phenol of the formula

where R is an aromatic nucleus, and R' is a radical selected from the group consisting of hydrogen and alkyl, and at least one molecular proportion of a ketone.

16. A rubber composition in which has been incorporated an alkenyl substituted phenol resulting from the reaction between 1 molecular proportion of a phenol of the formula

where R is an aromatic nucleus, and R' is a radical selected from the group consisting of hydrogen and alkyl, and at least one molecular proportion of acetone.

WILLIAM E. MESSER.